(No Model.)
A. ATKINS.
MEASURING DEVICE FOR SURVEYING AND OTHER PURPOSES.
No. 296,504. Patented Apr. 8, 1884.
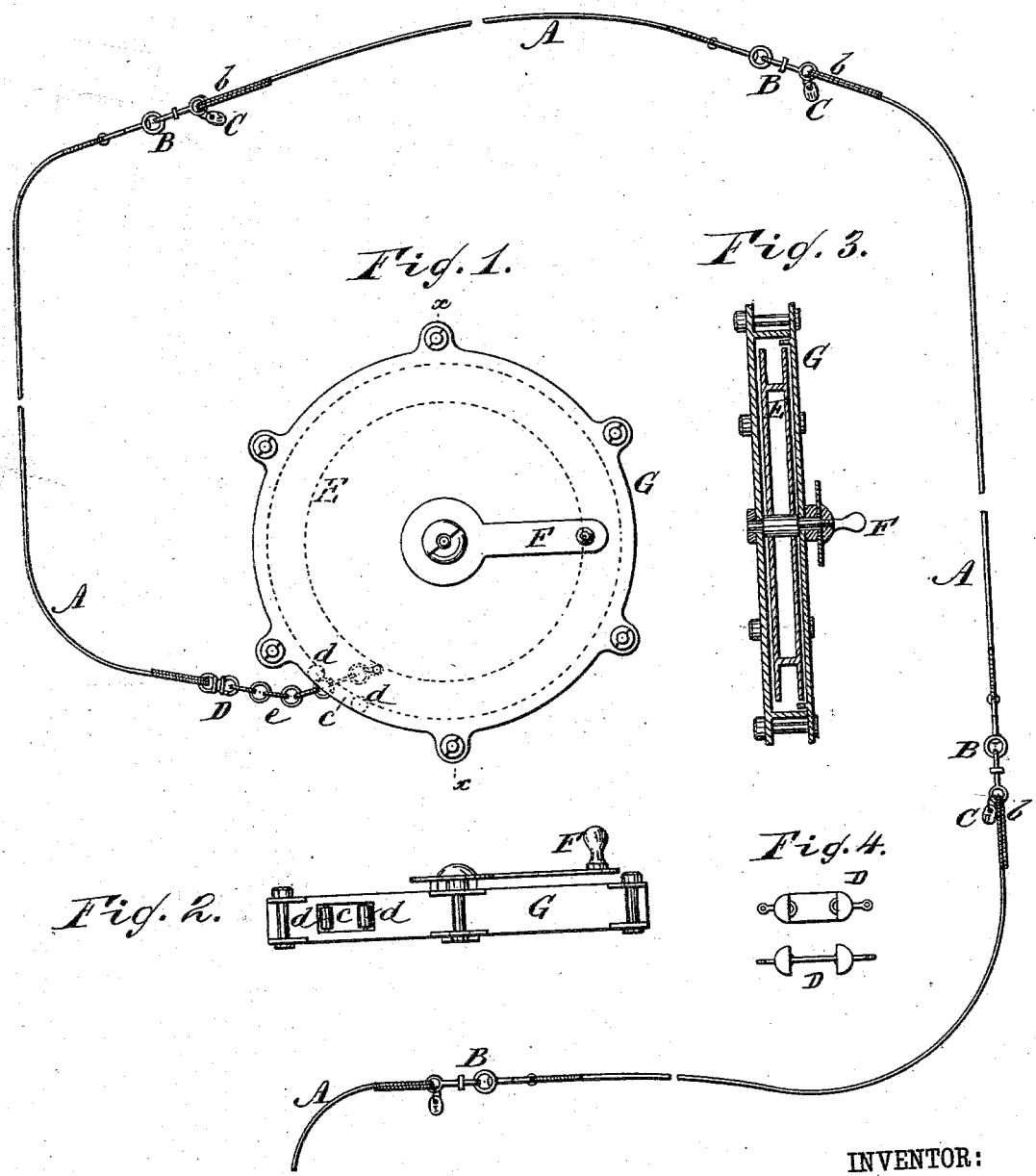

UNITED STATES PATENT OFFICE

ALFRED ATKINS, OF WANGANUI, NEW ZEALAND.

MEASURING DEVICE FOR SURVEYING AND OTHER PURPOSES.

SPECIFICATION forming part of Letters Patent No. 296,504, dated April 8, 1884.

Application filed November 9, 1883. (No model.)

*To all whom it may concern:*

Be it known that I, ALFRED ATKINS, of Wanganui, county of Wanganui, New Zealand, have invented new and useful Improvements in Measuring Devices for Surveying and other Purposes, of which the following is a full, clear, and exact description.

My invention relates to improvements in wire measuring devices; and it consists in the peculiar construction and arrangement of parts, as hereinafter fully described, and pointed out in the claim.

Reference is to be had to the accompanying drawings, forming part of this specification, in which similar letters of reference indicate corresponding parts in all the figures.

Figure 1 represents a plan or face view of the case of the instrument with the measuring-wire run out from it. Fig. 2 is a side view of the device, and Fig. 3 a transverse section thereof on the line $x\ x$ in Fig. 1. Fig. 4 represents views of a special construction of the swivels used.

A indicates the measuring-wire, composed of a series of continuous sections, the ends $b$ of which, where their junction is to be established, are doubled or folded and secured by twisting, brazing, or soldering, leaving loops, which, however, may be otherwise formed and attached. These loops serve to connect the sections of the wire with each other by means of interposed swivels B; or links and swivels may be used to prevent the "kinking" of the wire. Attached to each or any of these swivels may be a tally, C, for indicating distances, and at the outer end of the measuring-wire, which forms the initial point of measurement, also at the extreme inner end thereof, is a spring or other suitable opening and closing swivel, D. The several swivels may be of any suitable construction.

E is the winding-reel for the wire, capable of operation by a handle, F. This reel, which is in the form of a flanged drum, is arranged to rotate within an outer closed case, G, through a slot, $c$, in which, where anti-friction rollers $d\ d$ may be provided, the wire runs. The spring-swivel D at the inner final end of the wire is joined to the revolving drum or reel by a short chain, $e$, the inner end of which is fastened to the periphery of the drum, and the outer end of which is loose and hangs, when required, through the slot $c$, to allow the inner final end swivel, D, of the wire to be sprung on, ready for winding up.

The mode of using the wire or combination of wires for ordinary land-survey measuring, more especially in uneven country, is as follows: The traverse stations are arranged at distances apart not greater than the total length of the wire, together with that of a suitable tape marked with the fractional parts of the standard length. The surveyor, when observing the bearings of the traverse-lines, notes also each vertical angle, this being the angle included between the horizontal line and a line drawn from the traverse station observed at to that observed to. To measure the lines, the hindermost or following chainman, standing at the traverse station to be measured from, holds the reel and pays out the wire, the outer end of which the forward chainman or leader holds as he walks along the line to be measured toward the next forward traverse station, until within the distance of the standard length or some divisional part thereof indicated on the wire measure to the follower, who then ceases to pay out. The leader then attaches the fractionally-divided tape to the spring-swivel at the outer end of wire, and, paying out the tape, proceeds to the forward traverse station. They then holding the wire and tape at equal heights above the traverse station, (which may be arranged by having marks on their plumb-lines at equal distances from the points of their plumbs,) the follower holds the indicated distance-point on the wire plumb over the zero on traverse station at which he is standing, while the leader draws the tape so attached to the wire up till they receive that strain which will give the true standard length. This strain is decided by the surveyor when adjusting the wire or wires on a carefully-laid-down standard of length, using a spring-balance attached to one end of the wire or wires. In case of having to measure any distance with extreme accuracy, a spring-balance may be used in the field. The leader then notes the distance on the tape which is plumb over the zero-point of the traverse station at which he is standing, the follower reading off on the wire the number of whole lengths of standard and main divisional parts, if any, and the leader reading off on the tape the number of fractional parts of the standard, and the surveyor noting the sum of the distances both of the wire and of the tape between the plumb-lines, he, the surveyor, has then the exact length on the slope of the line to be measured. The true horizontal distance can then be easily ascertained by means of the vertical angle read when observing. The tape for measuring the fractional distances may be attached at will to the wire at any convenient intermediate point on the wire, instead of at its outer end, which end may then terminate in a bar or other convenient handle, either by having a spring-swivel on the end of the tape or by having spring-swivels at the indicated distances on the wire. In adopting this method the leader holds the outer end of the wire over the zero-point of the traverse station at which he is standing, as previously described, while the follower, attaching the tape to the wire by the spring-swivel at the indicated distance on the wire nearest to him in the direction of the leader, then brings the tape, by paying out, back to the traverse station to be measured from and drawing the tape and wire up till they receive the required strain. This will give the true standard length. The follower then notes the distance on the tape which is plumb over the zero-point of the traverse station at which he is standing, and reading off to the surveyor both the number of whole lengths of standard and main divisional parts, if any, on the wire, and also the number of fractional parts on the tape, the surveyor notes and proceeds as previously described.

The wire may have a sufficient number of indicated subdivisions to dispense with the use of a tape for the fractional parts of the standard length, or a separate wire having indicated upon it the fractional parts of the standard length may be used instead of the tape. The whole apparatus may either be made of or coated with any suitable known substance not injuriously affected by exposure to damp and the weather generally.

Having thus described my invention, what I claim as new, and desire to secure by Letters Patent, is—

An improved measuring device for surveying and other purposes, consisting of the wire A, composed of a series of sections, the swivels B, uniting said sections, the tallies C, the opening and closing swivels D on the outer and inner ends of the wire, and the chain e, for connecting the swivel on the inner end with a reel, substantially as herein shown and described.

ALFRED ATKINS.

Witnesses:
 CHAS. H. BORLASE,
  Notary Public, Wanganui, N. Z.
 C. H. AAMODT,
  Law Clerk, Wanganui, N. Z.